Oct. 4, 1966 R. W. PFEIFFER ETAL 3,276,842
PROCESS FOR CONTACTING CORROSIVE GASES WITH SOLID
DESICCANT IN THE OXIDATION OF AN INORGANIC HALIDE
Filed Aug. 2, 1961
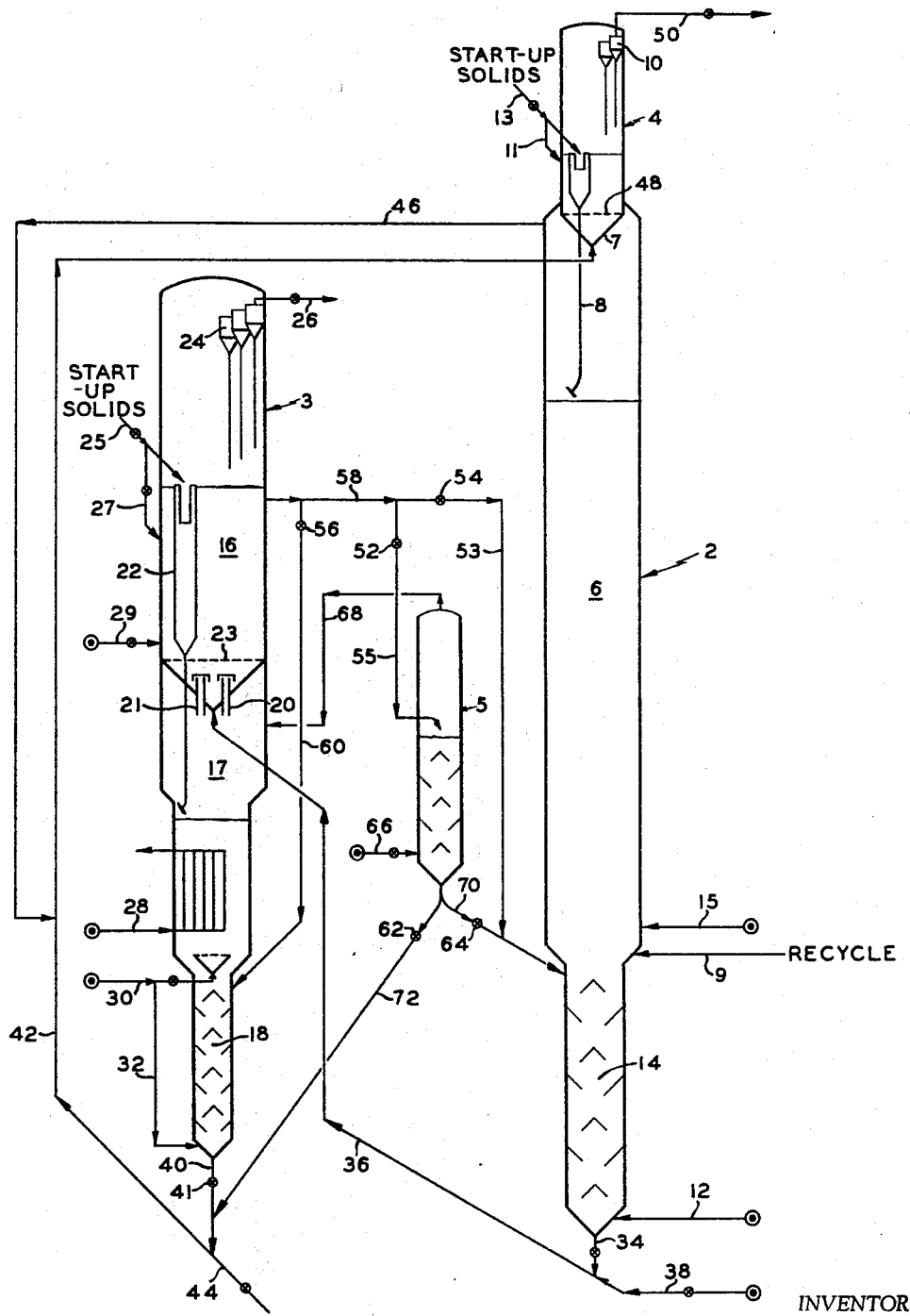
INVENTORS
ROBERT W. PFEIFFER
ARLEN G. SLIGER
BY
*G. H. Palmer*
ATTORNEY
*M. J. Maue*
AGENT

PROCESS FOR CONTACTING CORROSIVE GASES WITH SOLID DESICCANT IN THE OXIDATION OF AN INORGANIC HALIDE

Robert W. Pfeiffer, Bronxville, N.Y., and Arlen G. Sliger, Bergenfield, N.J., assignors to Pullman Incorporated, a corporation of Delaware
Filed Aug. 2, 1961, Ser. No. 128,859
18 Claims. (Cl. 23—219)

This invention relates to a process and apparatus for effecting fluidized catalytic reactions involving a halogen ion. In one aspect, the invention is directed to an improved, continuous process for the halogenation of hydrocarbons in a fluidized catalyst system. In another aspect, the invention is directed to an improved continuous process for the conversion of a hydrogen halide to halogen in the presence of a fluidized solid catalyst.

Whether the halogenation of a hydrocarbon or the production of halogen is desired, the basic reaction of the present process involves the oxidation of a halide to produce halogen and water; for it is known, that even in organic halogenation reactions, the production of halogen precedes the chlorination of the organic material except in cases where unsaturated aliphatic compounds are involved. When unsaturated aliphatic compounds are present in the reaction mixture, a secondary reaction involving the addition of halide moieties across the double bond of the olefin takes place to a lesser extent. Thus, in such instances, olefins can be directly halogenated with a hydrogen halide.

The market for a process capable of converting hydrogen halide to halogen is constantly increasing due to the large quantities of by-product waste hydrogen halide obtained in many chemical operations, particularly those which employ halogen as a feed stream. Examples of well-known oxidation reactions for this conversion include:

$$4HCl + O_2 \rightleftharpoons 2Cl_2 + 2H_2O$$

and $$12HCl + 2Fe_2O_3 \rightarrow 4FeCl_3 + 6H_2O$$

$$4FeCl_3 + 3O_2 \rightarrow 2Fe_2O_3 + 6Cl_2$$

Previous attempts to carry out these reactions have run into difficulties because of the low equilibrium conversions which are limited by the thermodynamics of the reaction to about 70 percent, the severe corrosion problems resulting from the aqueous mixture of HCl and $Cl_2$ and the costly $Cl_2$ recovery aggravated by the presence of water and unreacted HCl in the $Cl_2$ product. At first, it was believed that a fluidized solids system would enhance the conversion to halogen in these systems; however, it was found that the percent conversion remained unaltered even though many other advantages were realized such as a more constant temperature in the reaction zone and prevention of "hot spots" occurring due to the exothermic nature of the reaction. In both fixed bed and fluidized processes, the corrosion problems have remained a serious factor and have necessitated the dismantling of apparatus for replacement of parts such as dividing partitions, plugged or corroded transfer lines, etc. Moreover, the apparatus used for the subsequent recovery of product has necessarily been of the high corrosion resistant type and the physical separation of halogen from its admixture with water and hydrogen halide has proven difficult, involving not only the loss of some hydrogen halide reactant, but also unrecoverable amounts of halogen product.

Thus it is the purpose of the present invention to provide an apparatus and process for the production of halogen which avoids the above-mentioned difficulties.

Another object of this invention is to provide an improved, continuous and economically feasible method for the production of dry halogen from a halide.

Another object of this invention is to provide an improved continuous process for the halogenation of hydrocarbons.

Another object is to provide an improved continuous catalytic process for the production of dry chlorine product from hydrogen halide in the presence of a desiccant.

Still another object is to provide an improved process for producing a halogen-containing compound wherein the separation of the halogen-containing compound from the reactor effluent is greatly simplified.

Still another object is to provide a continuous catalytic process for the chlorination of hydrocarbons wherein the recovery of the chlorinated hydrocarbon is greatly simplified.

These and other objects will become apparent to those skilled in the art from the accompanying description and disclosure.

While the following discussion will be mainly directed to the conversion of a hydrogen halide to halogen, it will be understood that conversion of other halides, for example nitrosyl halide and ammonium halide, etc., to the corresponding halogen is included within the scope of this invention. It should also be understood that the halogenation of hydrocarbons such as paraffins, for example methane, ethane, propane, butane, pentane, etc.; aliphatically unsaturated compounds, for example ethylene, propylene, butylene, butadiene, acetylene, methyl acetylene, cyclobutylene, etc.; and aromatic compounds, for example benzene, toluene, xylene, phenol, etc., is also included within the scope of this invention.

The process of this invention comprises a combination of treating steps which apply to a continuous fluidized solids system wherein a solid catalyst and desiccant mixture are contacted with reactant gases to produce a halogen-containing product. The catalysts used in the conversion of inorganic halides, preferably chlorides or bromides, are those of the Deacon type, such as the metallic oxides and those set forth in copending application of Thomas H. Milliken, Serial No. 837,364, now U.S. 3,114,607, issued December 17, 1963. The catalysts employed for halogenating hydrocarbons are most preferably metallic halides, such as the halides of copper, iron, zinc and mercury. Copper silicate has also been employed as a halogenation catalyst. These catalysts, or any other catalysts suitable for this purpose, can be supported or unsupported, activated or non-activated depending upon the requirements of the specific reaction.

In the conversion of a halide to a halogen by reaction with an oxidizing agent, suitable oxidizing agents are compounds containing reactive oxygen. The preferred compounds are molecular oxygen, air, and ozone, although other oxidizing agents capable of generating molecular oxygen in situ at the reaction temperature such as peroxides, and inorganic oxides of nitrogen can also be employed. The mole ratio of oxygen to halide is between about 3:1 and about 1:10, preferably between about 1:1 and about 1:5.

Desiccants which are suitably employed in the process are preferably the bentonites which include montmorillonite, beidellite, nontronite, hectorite, saponite and sauconite; these desiccants are most preferably acid-activated. However, other desiccants such as, anhydrone, silica, alumina, calcium sulfate, etc., can also be employed, if desired. The desiccant is present in an amount between about 60 percent and about 99.9 percent by weight, preferably between about 80 percent and about 98 percent by weight, based on the total weight of desiccant and metal in the catalyst. The weight ratio of desiccant to water formed in the reaction zone is between about 50:1 and about 120:1, preferably between about 60:1 and about 80:1 or stoichiometric ratio with $H_2O$ produced by the reaction. It is necessary to maintain mixtures so that the lower limits of desiccant are not decreased, for when insufficient desiccant is present, the corrosion effect can be increased over systems which omit desiccant entirely.

According to the present invention, the steps of the process are carried out in at least three separate vessels, namely a reactor, a residence vessel and a regeneration vessel. The steps carried out in the reactor vessel comprise treating a halide with an oxidizing agent in the presence of a fluidized solids mixture of desiccant and catalyst in a reaction zone under reaction conditions which generally include a temperature between about 600° F. and about 1000° F. for the halide conversion, and between about 250° F. and 500° F. for hydrocarbon halogenation, under from about 0 p.s.i.g. to about 160 p.s.i.g.; continuously withdrawing reaction product effluent from the upper portion of the reaction zone; continuously passing wet desiccant solids downwardly through an adjacent stripping zone to remove any chemisorbed and/or entrained halogen and/or other gases with a stripping gas at a temperature and pressure at least as high as that maintained in the reaction zone, preferably at a temperature at least about 50° higher, and passing the resulting gaseous mixture upwardly into the reaction zone. The reactor effluent solids are stripped and then removed from the reaction vessel and passed to a regeneration zone in the upper portion of the separate regeneration vessel wherein at an elevated temperature, e.g., in cases where bentonite desiccant is employed, between about 1000° F. and about 1400° F., the solids are dried and a portion of the regenerated solids are passed downwardly into a cooling zone where they are cooled at least about 100° below the temperature of halogen formation in the reaction zone. The cooled solids and regenerated uncooled solids enter a lower stripping zone where the solids are stripped of adsorbed and entrained inert gases at a temperature below the temperature in the reaction zone but not more than 350° below the temperature of halogen formation in the reaction zone.

An important advantage of cooling the regenerated solids prior to stripping is obtained, for by locating the cooling zone immediately adjacent regeneration, corrosive gas mixtures do not come in contact with the cooling coil thus the deterioration of apparatus due to corrosion in the cooling zone is completely eliminated. A further advantage of locating the cooling zone above the stripping zone is that the downward flow of solids through the regeneration vessel can be maintained at a uniform rate. Since a greater area must be provided for good contact in the heat exchange zone to achieve temperature equilibrium than the area needed for stripping, the regenerator vessel is divided into three zones of graduated volume, the cooling zone being smaller than the regenerator and the regenerator stripping zone, in the bottom of the vessel, being smaller than the cooling zone. Still another advantage of stripping after lowering the temperature of the regenerated solids is that the catalyst, some which may be in the vapor phase due to the high regeneration temperature, will condense at the lower temperature on the solids in the cooling zone, thus avoiding loss of catalyst in the vent gas from the regenerator.

A portion of the regenerated uncooled solids can be passed directly to the reactor stripper for downward passage therethrough to maintain the temperature therein at a higher level than the reaction temperature. Since these solids do not enter the reaction zone, restoration of high catalyst activity with oxygen is not required, and hence stripping with air is not required.

The regenerated stripped solids, at a temperature of at least about 100° below the reaction temperature, are withdrawn from the lower portion of the regenerator vessel and passed upwardly with the aid of a fluidizing gas and overhead reactor effluent gases. In the course of this passage, the solid materials are heated and the reactor effluent cooled to a temperature approaching equilibrium. The solids and reactor effluent mixture is then passed to a separate residence and drying zone wherein equilibrium conditions are attained and water is reduced essentially to zero, thus eliminating the usual corrosion problems. The regenerated and reactivated solids, which may contain a trace of water from the reactor effluent gases, are continuously withdrawn and passed to the reaction zone while the product effluent passes overhead for the recovery of halogen product.

The present design has many advantages in addition to those discussed above which militate its commercial success, for example, the separate treating vessels enable foraminous separators between treating zones to be eliminated. Plugging problems which sometimes develop with dust fines are also avoided and avoidance of reactivating the total fluid catalyst particles with air provides for more efficient operation.

For a better understanding of the present process, reference is now had to the accompanying drawing which illustrates particular and preferred embodiments of the present process, but is not to be construed as limiting to the scope of the present invention.

In the figure, vessel 2 is a reaction vessel; vessel 3 is a regeneration vessel; vessel 4 is a holding and drying vessel; and vessel 5 is a flue gas stripper. As shown in the present design, holding and drying chamber 4 is integrally mounted at the top of reaction vessel 2 to allow for gravity transfer of regenerated solids from chamber 4 to adjacent lower reaction chamber 6. Chamber 4 is sealed from reaction zone 6 of chamber 2 by a solid conical bottom portion 7 and is equipped with a solids draw-off standpipe 8 having its upper end at the fluid bed level in chamber 4 and its lower end terminating in reaction chamber 6; said standpipe having a flapper valve at its lower end for eliminating back flow in the standpipe and for maintaining the seal between chamber 6 and chamber 4. Chamber 4 is also equipped with a series of cyclones 10 for separating halogen-containing product from solid materials entrained therewith by fluidization.

The lower portion of vessel 2 of a reduced height and circumference serves as stripping section 14 for reactor effluent solids and is baffled for better contact of solids with stripping gas entering the lower portion of the vessel and chamber 14 from line 12. Solids requiring regeneration are downwardly withdrawn from the lower portion of vessel 2 and chamber 14 by means of valved line 34 and transferred to the upper chamber of vessel 3 by means of transfer line 36 with the aid of lift gas entering conduit 36 from valved line 38.

Regenerator vessel 3 contains an upper regeneration chamber 16, an adjacent lower cooling chamber 17 and a bottom, baffled stripping chamber 18. Communication between chambers 17 and 16 is provided by capped gas risers 20 and 21 and downflow solids standpipe 22, the mouth of which standpipe is located at the bed level of the fluidized solids in chamber 16 and the lower end of standpipe 22 terminating in chamber 17 with a flapper valve adapted to prevent back flow therein and to maintain a solids seal between chambers 16 and 17. Otherwise these chambers are separated by the conical bottom portion of chamber 16. Chamber 16 also contains a series of cyclone separators 24 adapted to remove solid materials from inert flue gases and to pass said flue gases out of the system by means of valved take-off line 26. Foraminous member 23 is affixed to the base of the conical bottom portion of chamber 16 as a means for providing better solids contact and distribution between the fluidized mixture of a regeneration gas entering chamber 16 through risers 20 and 21 and wet solids entering chamber 16 through a solids conduit at the apex of the conical bottom portion (line 36).

The cooling medium in cooling coil 28 establishes the temperature of zone 17 by indirect heat exchange with the downward passage of dried, regenerated solids in countercurrent contact with the upward passage of stripping and combustion gas, e.g., air, from valved lines 30 and 32 in the lower portion of vessel 3. The bottom, baffled portion of vessel 3 describes stripping zone 18 in which adsorbed and entrained flue gas, which may be entrained with the regenerated solid material passing downwardly therethrough, is removed. The stripping is accomplished by countercurrent contact of solids with stripping gas entering the bottom of vessel 3 through gas line 32; and the upward passage of gas from lines 30 and 32 maintains the fluidized condition of solids in chambers 17 and 18. On continuing upward passage the gas enters risers 20 and 21 and is introduced into regeneration chamber 16 wherein combustion is carried out with a reactive gas.

Dry regenerated solids are removed from the bottom of vessel 3 by means of valved line 40 and passed upwardly to the bottom of vessel 4 by means of transfer line 42 with the aid of aeration gas entering conduit 42 through valved line 44. Reactor effluent gases are withdrawn from the upper portion of chamber 6 in line 46 and introduced into transfer line 42 for direct heat exchange with the solid materials therein and as an aid to the upward transfer of the solids materials into zone 4. The solids-gas mixture from line 42 enters the conical bottom of chamber 4, passes upwardly through grid 48 and is separated into solid and gaseous phases by means of separators 10. The product gases are then removed from chamber 4 by means of line 50 and the solid materials are returned to the lower portion of chamber 4 until the level of the solid bed overflows standpipe 8 for downward passage of regenerated solids into reaction chamber 6. In vessel 4 any small or trace amount of water which has not been removed from the product effluent in chamber 6 due to the equilibrium vapor pressure of the water over clay at the temperature in zone 6, is essentially completely adsorbed by the regenerated desiccant at the lower temperature maintained therein.

A portion of the solid materials from regeneration vessel 3 by-passes cooling chamber 17, and is returned to the system by either of two alternate methods shown in the drawing; although it is to be understood that other alternates of this stage of the process will become apparent to those skilled in the art. One method of returning regenerated uncooled solids to the system comprises closing valves 52 and 64 and opening valves 54 and 56. In this way, regenerated solids are withdrawn from the upper portion of the fluidized bed in the regeneration zone and a portion passed through line 58 for direct recycle into stripping chamber 14 of reactor vessel 2 to maintain high temperature therein while the remaining portion of regenerated solids is passed through line 60 to the top of regenerator stripping chamber 18 for subsequent return to reaction chamber 6 after passage through chamber 18, transfer line 42 and vessel 4.

The alternate method shown by the drawing for returning regenerated uncooled solids to the system comprises closely valves 56 and 54 and opening valves 52, 62 and 64. In this scheme, the regenerated solids are removed from the upper portion of the bed in chamber 16, passed through lines 58 and 55 to stripping zone 5 wherein they are stripped of flue gas with stripping gas entering baffled chamber 5 through valves line 66 in countercurrent contact with the solids. The flue gases separated from the solids are removed overhead with stripping gas through line 68 and returned to cooling chamber 17 for upward flow into chamber 16 from the risers. The stripped regenerated solids are withdrawn from the bottom of chamber 5 and a portion passed to the top of reaction stripper 14 by means of line 70 while the remaining portion is passed to transfer line 42 by means of line 72.

This latter method employing stripping vessel 5 realizes the advantage of preventing detrimental amounts of entrained flue gas from entering the reaction zone from stripping zone 14.

The following description relates to a specific operation for the conversion of hydrogen chloride to chlorine gas and serves as an example of the present invention employing preferred conditions for the production of chlorine.

At the start-up valves 26, 56, 52 and 54 are closed and the solid materials comprising a mixture of montmorillonite clay desiccant and chromium sesquioxide catalyst supported on a silica carrier, with the desiccant present in an amount of about 80 percent by weight based on the total weight of desiccant and metal in the catalyst, is heated by external heater (not shown) to about 600° F. The heated solids are introduced into standpipe 22 by means of valved line 25. Air is continuously introduced through valved line 30 and line 32 at a temperature increasing from 600° F. to 1100° F. to start the steam generation in coil 28 and, by upward flow into chamber 16 through risers 20 and 21, to heat the chambers of the regenerator. A separate portion of the heated solid mixture is introduced into regeneration bed 16 by means of valved line 27 to establish the bed level therein. The introduction of solids into chamber 16 is continued until the level of the bed overflows standpipe 22 and the level of the bed is not attained until the solid seal in standpipe 22 between chambers 16 and 17 is established. The solids are then permitted to pass downwardly through standpipe 22 into chamber 17 and into chamber 18 before being withdrawn from the regeneration vessel by means of valved line 40.

The continuous circulation of air containing a small amount of chlorine is maintained through reactor vessel 2 from recycle line 9 after establishing a solids seal in standpipe 8 and establishing the bed level in vessel 4 by means of start-up solid introduction from lines 11 and 13 and establishing the bed level in reaction chamber 6 by passage of solids downwardly from vessel 4 through standpipe 8. These solid start-up lines may be used if desired in later operation to replace solids lost by attrition and entrainment, although for practical consideration in the operation of this process, the introduction of solids is substantially terminated as soon as the bed levels and solids seals between, and in the various zones, are established. After the bed level in reaction chamber 6 has been reached, valved line 34 is opened to permit transfer of the solids to regeneration vessel 3 and air is introduced into line 36 from valved line 38 to aid in the upward transfer of these solids. The reaction vessel 2 is then purged with oxygen, valves 41, 56 and 54 are opened and the continuous circulation of solids through vessels 3, 4, and 2 is started together with the introduction of gaseous hydrogen chloride from line 15. The hydrogen chloride from line 15 and oxygen from line 12 are reacted in reaction chamber 6 at a temperature of 850° F. under 55 p.s.i.g. in the presence of a fluidized mixture of solid materials defined above. The mole ratio of hydrogen chloride:oxygen entering the reaction zone is about 1.5:1. The reactor effluent passes to the upper portion of the reaction vessel wherein entrained solids are disengaged and fall back into the fluidized bed maintained therein while the gaseous material is withdrawn by means of line 46.

After the desiccant has adsorbed about 2 percent by weight of water, the solids are stripped of adsorbed chlorine or chlorine-containing gas in baffled stripping zone 14 by means of an upward current of oxygen entering the bottom of the stripping zone from line 12. The gaseous mixture is passed upwardly into the reaction zone while the stripped solids are withdrawn downwardly through valved line 34 and into transfer line 36 for upward passage into chamber 16 by means of air entering transfer line 36 from valved line 38. The reactor stripping zone is maintained at a temperature of about 950° F. under about 68 p.s.i.g.

Natural gas is introduced into chamber 16 by means of valved line 29 for combustion therein with air entering chamber 16 through risers 20 and 21. The combustion of these gases enables the temperature in regeneration zone 16 to be maintained at 1100° F. under a pressure of about 57 p.s.i.g. The solids are fluidized in this regeneration zone by upwardly moving air, natural gas and the flue gases resulting from the combustion of said natural gas. The regenerator effluent passes to the upper portion of vessel 3 for disengagement of solids entrained therewith and enters a series of separating zones defined by cyclones 24 which separate the flue gases from the entrained regenerated solids. The flue gases are removed from the system through valved line 26 and the solids are returned to the fluidized bed in chamber 16 by means of the cyclones' diplegs. Regenerated solids overflowing standpipe 22 are passed downwardly into chamber 17 for cooling to a temperature of about 585° F. under a pressure of 61 p.s.i.g. by indirect heat exchange with steam generator coil 28. The solids in the cooling zone are also maintained in fluidized condition by upward passage of air entering vessel 3 from lines 30 and 32. The cooled solids pass downwardly into regenerator stripping chamber 18 wherein at a temperature of about 585° F. under about 65 p.s.i.g. they are stripped of flue gas while catalyst is reactivated by countercurrent contact with oxygen in the air stream from line 32. The solid materials are then withdrawn from the regenerator stripping zone 18 through valved line 40 and passed into transfer line 42 for upward passage into the bottom of residence or final drying zone 4. The upward passage of the stripped regenerated solids is aided with an aeration gas, hereinafter described, entering conduit 42 from valved line 44 and by reactor effluent lift gas from line 46. The gas and solid mixture in line 42 enter residence zone 4 at a temperature of between about 600° F. and about 610° F. under a pressure of 48 p.s.i.g. In vessel 4 an equilibrium temperature of about 605° F. is attained and trace amounts of water are absorbed by the regenerated desiccant material before the gaseous product is passed upwardly to the upper portion of vessel 4 and removed through valved line 50 after passing through cyclone separators 10.

A portion of the regenerated solids not removed from zone 16 by overflowing standpipe 22 is withdrawn through line 58 and split into two streams. One stream is recycled directly to the top of the reaction stripping zone by means of valved line 54 and the other stream is passed through valved line 56 into regenerator stripping section 18 to maintain the desired temperature therein while the entrained flue gases are being removed from the solids before recycle of these solids to the reaction zone.

Since various systems for the recovery of chlorine from the reaction mixture are well known and can be applied in the present process for the recovery of the chlorine product, the individual recovery steps have not been shown in FIGURE 1. A convenient method for obtaining pure, dry chlorine, which is a preferred recovery in the present process, is effected as follows. The product removed through valved line 50, containing about 44 percent chlorine, 30 percent oxygen and 25 percent nitrogen is passed to a scrubbing zone where the effluent gases are washed with liquid chlorine. The washed materials and vaporized chlorine at a temperature of about 22° F. under about 64 p.s.i.a. are passed to a compressing zone wherein the temperature is raised to 102° F. and the pressure to 98 p.s.i.a. This material is cooled to −11° F. and passed to a separator for separating a vaporous overhead containing about 24 percent chlorine, 38 percent oxygen and 34 percent nitrogen and a liquid material containing substantially pure chlorine. The liquid portion is passed to chlorine storage while a portion of the vaporous overhead is recycled to the system reaction zone by means of line 9 and another portion is recycled by means of valved line 44 for use as an aeration gas for regenerated stripped solids in line 42. The remaining portion of the vaporous overhead is compressed to about 330 p.s.i.a. and condensed at a temperature of about −35° F. and passed to chlorine storage. The chlorine recovered represents a 98 percent yield of chlorine product.

It is to be understood that the conversion of other hydrogen halides to the corresponding halogen can be substituted in the above example together with suitable reaction conditions of temperature and pressure and that in the above example or any substitutions in the above example, a hydrocarbon, particularly ethane, ethylene, propane, propylene, butane, butylene, butadiene, etc., can be included in the reaction zone to produce the corresponding chlorinated product under the conditions described hereinabove.

Having thus described our invention we claim:

1. A continuous process for the production of an elemental halogen which comprises the steps in combination: in a reactor having a reaction zone and a first stripping zone, catalytically reacting an inorganic halide with an oxidizing agent in the presence of a solid desiccant at an elevated temperature and under fluidized solids conditions to effect the formation of said gaseous elemental halogen and water and adsorbing the water in the desiccant as it is formed; removing gaseous reactor effluent from the reaction zone; withdrawing and passing wet solids to the first stripping zone to remove and recover any entrained halogen-containing substance from the solids; passing wet solids to a separate regenerator containing a regeneration zone, a cooling zone and a second stripping zone; drying the wet solids in the regeneration zone; returning a portion of the regenerated solids to said first stripping zone; passing another portion of regenerated solids through the cooling zone to adjust the temperature of the solids to below the halide reaction temperature; passing the cooled solids through the second stripping zone to remove entrained inert gases; passing the inert gases and stripping gas upwardly through the cooling zone and regeneration zone to maintain fluidized conditions in these zones; passing the resulting cooled solids from the second stripping zone, in admixture with the gaseous reactor effluent to a separate product effluent drying zone wherein water, at a lower vapor pressure as compared with the vapor pressure in the reaction zone, is adsorbed by the desiccant; recovering an anhydrous product containing elemental halogen from said product effluent drying zone; and passing the desiccant from the product effluent drying zone to the reaction zone for repeated contact with reactant gases therein.

2. The process of claim 1 wherein the halide is a hydrogen halide, and the oxidizing agent is oxygen.

3. The process of claim 1 wherein a portion of the regenerated solids by-pass the cooling zone and are passed to the secondary stripping zone to maintain the temperature therein at not less than 300° F.

4. A continuous process for the production of a halogen-containing hydrocarbon compound which comprises the steps in combination: in a reactor having a reaction zone and a first stripping zone, catalytically reacting an inorganic halide with an oxidizing agent in the presence of a $C_1$ to $C_6$ hydrocarbon and in the presence of a solid desiccant at an elevated temperature under fluidized solids conditions to effect the formation of said halogen-containing hydrocarbon compound and water adsorbing water in the desiccant as it is formed; removing gaseous reactor effluent from the reaction zone; withdrawing and passing wet solids downwardly to the first stripping zone to remove and recover any entrained halogen-containing substance from the solids; returning the halogen-containing substance upwardly to the reaction zone; withdrawing wet solids downwardly from said stripping zone and passing them to a separate regenerator containing a regeneration zone, a cooling zone, and a second stripping zone; drying the wet solids in the regeneration zone by the heat generated in combustion of fuel; passing a portion of the regenerated solids downwardly through the cooling zone to adjust the temperature to at least 100° below the reaction temperature; passing the cooled solids through the second stripping zone following the cooling zone in contact with a stripping gas to remove entrained flue gases;

passing the flue gases and stripping gas upwardly through the cooling zone and regeneration zone to maintain fluidized conditions in these zones; withdrawing a portion of the uncooled regenerated solids from the regeneration zone and passing them to a separate third stripping zone wherein at a temperature above the temperature in the first and second stripping zones in the solids are stripped of flue gases; passing a portion of the solids from the third stripping zone to the first stripping zone to maintain an elevated temperature therein and admixing the remaining portion of the solids from the third stripping zone with the solids leaving the second stripping zone and passing the solids thus admixed, together with the gaseous reactor effluent to a separate product effluent drying zone wherein water, at a lower vapor pressure as compared with the vapor pressure in the reaction zone, is adsorbed by the regenerated desiccant; recovering the anhydrous halogen-containing hydrocarbon product from said product effluent drying zone and passing the desiccant from the product effluent drying zone to the reaction zone for repeated contact with reactant gases therein.

5. A continuous process for the production of elemental halogen gas which comprises the steps in combination: in a reactor, having a reaction zone and a lower first stripping zone, catalytically reacting a hydrogen halide with oxygen in the presence of at least 60 weight percent of a solid desiccant based on total catalyst at an elevated temperature under fluidized solids conditions to effect the formation of elemental halogen gas and water and adsorbing the water in the desiccant as it is formed; removing the gaseous product containing elemental halogen effluent from the upper portion of the reaction zone; withdrawing and passing wet solids from the bottom of the reaction zone downwardly into the first stripping zone in countercurrent contact with oxygen as the stripping gas to remove and recover any entrained elemental halogen from the solids; passing the recovered halogen together with oxygen upwardly into the reaction zone; withdrawing the wet solids downwardly from said stripping zone and passing them to a separate regenerator containing a regeneration zone, a lower cooling zone and a bottom stripping zone; drying the wet solids in the regeneration zone; returning a portion of the regenerated solids to said first stripping zone; passing another portion of regenerated solids through the lower cooling zone to reduce the temperature of solids at least 250° below the reaction temperature; passing the entire portion of cooled solids downwardly through the second stripping zone in countercurrent contact with air as the stripping gas to remove entrained inert gases; passing the inert gases and air upwardly through the cooling zone and regeneration zone to maintain fluidized conditions in these zones; admixing the solids from the second stripping zone with the gaseous product effluent to effect direct heat exchange; passing the gaseous and solids mixture to a separate product effluent drying zone wherein temperature equilibrium is attained and water, at a lower vapor pressure as compared with the vapor pressure in the reaction zone, is adsorbed by the desiccant; maintaining fluidized solids conditions in the product effluent drying zone; separating the gaseous product effluent from the solids and recovering anhydrous elemental halogen from the gaseous product effluent withdrawn from the top of said product effluent drying zone; and passing the desiccant from the lower portion of the product effluent drying zone to the reaction zone to maintain a constant reaction temperature and for repeated contact with reactant gases therein.

6. The process of claim 5 wherein hydrogen chloride is the hydrogen halide and chlorine is the halogen product.

7. The process of claim 5 wherein the catalyst in the reaction zone is chromium sesquioxide and the desiccant is an acid activated bentonite.

8. The process of claim 5 wherein the drying of solids in the regeneration zone is accomplished by direct heat exchange with the heat generated by the combustion of natural gas with air.

9. The process of claim 5 wherein the elemental halogen is recovered in a liquid anhydrous state from the product effluent by washing with liquid halogen, compressing and condensing, and a portion of the product effluent is recycled to the reaction zone to maintain oxygen at a higher partial pressure than the other components therein.

10. The process of claim 5 wherein the transportation of the solid materials between the reactor and regenerator and between the regenerator and product effluent drying zone is accomplished with an air lift gas.

11. A continuous fluidized process for the production of elemental chlorine which comprises the steps in combination: in a reactor, having a reaction zone and a lower stripping zone, catalytically reacting hydrogen chloride with oxygen in the presence of at least 60 percent by weight of a solid desiccant, at a temperature between about 800° F. and about 900° F. under a pressure of from about 40 p.s.i.g. to about 100 p.s.i.g. and fluidized solids conditions to effect the formation of elemental chlorine, gas and water and adsorbing the water in the desiccant as it is formed; removing the gaseous chlorine product effluent from the upper portion of the reaction zone; withdrawing and passing wet solids from the bottom of the reaction zone downwardly into the first stripping zone in countercurrent contact with oxygen as the stripping gas at a temperature between about 900° F. and about 1000° F. to remove and recover any entrained elemental chlorine from the solids; passing the recovered elemental chlorine together with the oxygen reactant upwardly into the reaction zone to maintain fluidized conditions therein; withdrawing the wet solids downwardly from said stripping zone and passing them to a separate regenerator containing a regeneration zone, a lower cooling zone and a bottom stripping zone; drying the wet solids in the regeneration zone at a temperature of between about 1050° F. and about 1200° F. by means of heat generated in the combustion of air and natural gas; returning a portion of the regenerated solids to said first stripping zone, at the temperature attained in the regeneration zone; passing another portion of regenerated solids through the lower cooling zone to reduce the temperature of the solids to between about 550° F. and about 650° F.; passing the entire portion of cooled solids downwardly through the second stripping zone in countercurrent contact with air as the stripping gas to remove entrained flue gases; removing a third portion of regenerated solids from the regeneration zone and introducing them directly to the second stripping zone while bypassing the cooling zone; passing the flue gases and air upwardly through the cooling zone and regeneration zone to maintain fluidized conditions in these zones; admixing the solids from the second stripping zone with an aeration gas and the gaseous product effluent; passing the resulting gaseous and solids mixture to a separate product effluent drying zone wherein a temperature equilibrium of between about 575° F. and about 675° F. is attained, and water, at a lower vapor pressure as compared with the vapor pressure in the reaction zone, is adsorbed by the desiccant; separating the gaseous product effluent from the solids and recovering anhydrous elemental chlorine from the gaseous product effluent withdrawn from the top of said product effluent drying zone; and passing the desiccant from the lower portion of the product effluent drying zone to the reaction zone to maintain a constant reaction temperature and for repeated contact with reactant gases therein.

12. The process of claim 11 wherein a portion of the product effluent is recycled to the reactor to maintain the partial pressure of oxygen in the reaction zone at between about 10 p.s.i.a. and about 50 p.s.i.a.

13. The process of claim 12 wherein another smaller portion of the product effluent is employed as an aeration gas for the solids being transported from the regenerator to the product effluent drying zone.

14. A continuous process for the production of chlorinated hydrocarbons which comprises the steps in combination: in a reactor, having a reaction zone and a lower first stripping zone, catalytically reacting hydrogen chloride, with oxygen in the presence of a hydrocarbon and a solid desiccant at an elevated temperature under fluidized solids conditions to effect the formation of chlorinated hydrocarbon product and water and absorbing the water in the desiccant as it is formed, removing the gaseous chlorinated product effluent from the upper portion of the reaction zone; withdrawing and passing wet solids from the bottom of the reaction zone downwardly into the first stripping zone in countercurrent contact with oxygen as the stripping gas to remove and recover any entrained chlorinated product from the solids; passing the recovered chlorinated product together with oxygen upwardly into the reaction zone, withdrawing the wet solids downwardly from said stripping zone and passing them to a separate regenerator containing a regeneration zone, a lower cooling zone and a bottom stripping zone, drying the wet solids in the regeneration zone; returning a portion of the regenerated solids to said first stripping zone; passing another portion of regenerated solids through the lower cooling zone to reduce the temperature of solids at least 250° below the reaction temperature; passing the entire portion of cooled solids downwardly through the second stripping zone in counter-current contact with air as the stripping gas to remove entrained flue gases, passing the flue gases and air upwardly through the cooling zone and regeneration zone to maintain fluidized conditions in these zones; admixing the solids from the second stripping zone with the gaseous product effluent to effect direct heat exchange; passing the gaseous and solids mixture to a separate product effluent drying zone wherein temperature equilibrium is attained and water, at a lower vapor pressure as compared with the vapor pressure in the reaction zone, is adsorbed by the desiccant; maintaining fluidized solids conditions in the product effluent drying zone; separating the gaseous chlorinated product effluent from the solids and recovering anhydrous chlorinated hydrocarbon from the gaseous product effluent withdrawn from the top of said product effluent drying zone; and passing the desiccant from the lower portion of the product effluent drying zone to the reaction zone to maintain a constant reaction temperature and for repeated contact with reactant gases therein.

15. The process of claim 14 wherein the chlorination reaction in the reaction zone is carried out at a temperature between about 480° F. and about 800° F.

16. The process of claim 14 wherein the hydrocarbon is a $C_2$ hydrocarbon and the chlorinated product is a chloroethane.

17. A continuous process for the production of an anhydrous halogenated hydrocarbon which comprises the steps in combination: in a reactor having a reaction zone and a first stripping zone, catalytically reacting an inorganic halide with an oxidizing agent in the presence of a $C_1$ to $C_6$ hydrocarbon and in the presence of a solid desiccant at an elevated temperature and under fluidized solids conditions to effect the formation of the gaseous halogenated hydrocarbon and water; adsorbing the water in the desiccant as it is formed; removing gaseous reactor effluent from the reaction zone; withdrawing and passing wet solids to the first stripping zone to remove and recover any entrained halogen-containing substance from the solids; passing wet solids to a separate regenerator containing a regeneration zone, a cooling zone and a second stripping zone; drying the wet solids in the regeneration zone; returning a portion of the regenerated solids to said first stripping zone; passing another portion of regenerated solids through the cooling zone to adjust the temperature of the solids to below the halide reaction temperature; passing the cooled solids through the second stripping zone to remove entrained inert gases; passing the inert gases and stripping gas upwardly through the cooling zone and regeneration zone to maintain fluidized conditions in these zones; passing the resulting cooled solids from the second stripping zone, in admixture with the gaseous reactor effluent to a separate product effluent drying zone wherein water, at a lower vapor pressure as compared with the vapor pressure in the reaction zone, is adsorbed by the desiccant; recovering the anhydrous halogenated hydrocarbon product from said product effluent drying zone; and passing the desiccant from the product effluent drying zone to the reaction zone for repeated contact with reactant gases therein.

18. A continuous process for the production of an anhydrous elemental halogen which comprises the steps in combination: in a reactor having a reaction zone and a first stripping zone, catalytically reacting an inorganic halide with an oxidizing agent in the presence of a solid desiccant at an elevated temperature under fluidized solids conditions to effect the formation of said anhydrous elemental halogen and water; adsorbing water in the desiccant as it is formed; removing gaseous reactor effluent from the reaction zone; withdrawing and passing wet solids downwardly to the first stripping zone to remove and recover any entrained halogen-containing substance from the solids; returning the halogen-containing substance upwardly to the reaction zone; withdrawing wet solids downwardly from said stripping zone and passing them to a separate regenerator containing a regeneration zone, a cooling zone, and a second stripping zone; drying the wet solids in the regeneration zone by the heat generated in combustion of fuel; passing a portion of the regenerated solids downwardly through the cooling zone to adjust the temperature to at least 100° below the reaction temperature; passing the cooled solids through the second stripping zone following the cooling zone in contact with a stripping gas to remove entrained flue gases; passing the flue gases and stripping gas upwardly through the cooling zone and regeneration zone to maintain fluidized conditions in these zones; withdrawing a portion of the uncooled regenerated solids from the regeneration zone and passing them to a separate third stripping zone wherein at a temperature above the temperature in the first and second stripping zones the solids are stripped of flue gases; passing a portion of the solids from the third stripping zone to the first stripping zone to maintain an elevated temperature therein and admixing the remaining portion of the solids from the third stripping zone with the solids leaving the second stripping zone and passing the solids thus admixed, together with the gaseous reactor effluent to a separate product effluent drying zone wherein water, at a lower vapor pressure as compared with the vapor pressure in the reaction zone, is adsorbed by the regenerated desiccant; recovering the anhydrous elemental halogen product from said product effluent drying zone and passing the desiccant from the product effluent drying zone to the reaction zone for repeated contact with reactant gases therein.

References Cited by the Examiner

UNITED STATES PATENTS

| | | | |
|---|---|---|---|
| 2,318,512 | 5/1943 | McHaffie | 23—219 XR |
| 2,393,229 | 1/1946 | Bouchard | 23—219 XR |
| 2,436,870 | 3/1948 | Murphree | 23—219 |
| 2,542,961 | 2/1951 | Johnson et al. | 23—219 |
| 2,602,021 | 4/1952 | Belchetz | 23—219 |
| 2,678,259 | 5/1954 | Banner et al. | 23—219 |
| 2,746,844 | 5/1956 | Johnson et al. | 23—219 |
| 2,750,002 | 6/1956 | Hooker et al. | 23—219 XR |
| 3,006,732 | 10/1961 | Baumgartner et al. | 23—219 |

OSCAR R. VERTIZ, *Primary Examiner.*

MAURICE A. BRINDISI, *Examiner.*

E. STERN, *Assistant Examiner.*